United States Patent [19]

Lee et al.

[11] Patent Number: 4,618,917
[45] Date of Patent: Oct. 21, 1986

[54] INTEGRAL PHONE LIGHT ACCESSORY

[75] Inventors: Peter Lee, Monterey Park; George F. Cheung, La Mirada; Joe T. Yee, Huntington Beach, all of Calif.

[73] Assignee: American Phone Products, Anaheim, Calif.

[21] Appl. No.: 645,840

[22] Filed: Aug. 31, 1984

[51] Int. Cl.$^4$ ............................................. H04M 1/22
[52] U.S. Cl. ................................ 362/88; 179/81 C; 179/84 L
[58] Field of Search .................. 362/86, 88, 24; 179/81 C, 84 L, 90 L, 146 L

[56] References Cited

U.S. PATENT DOCUMENTS

| | | | |
|---|---|---|---|
| 1,752,211 | 3/1930 | Szwajkart | 362/24 |
| 1,893,325 | 1/1933 | Foster et al. | 362/24 |
| 1,955,972 | 4/1934 | Muse | 362/24 |
| 3,396,244 | 8/1968 | Kowaleski | 179/81 C |
| 3,500,293 | 3/1970 | Cocco | 362/24 |
| 4,124,879 | 11/1978 | Schoemer | 362/24 |
| 4,349,705 | 9/1982 | Kuhfus | 362/24 |
| 4,382,161 | 5/1983 | Saer et al. | 179/81 C |

FOREIGN PATENT DOCUMENTS

| | | | |
|---|---|---|---|
| 1215162 | 12/1962 | Italy | 362/88 |
| 1030141 | 5/1966 | United Kingdom | 362/88 |

Primary Examiner—Ira S. Lazarus
Attorney, Agent, or Firm—G. Donald Weber, Jr.

[57] ABSTRACT

A phone light accessory comprising a light producing element and a conductor element which is integrated into the hand set apparatus of many standard telephone designs.

15 Claims, 8 Drawing Figures

U.S. Patent  Oct. 21, 1986  4,618,917
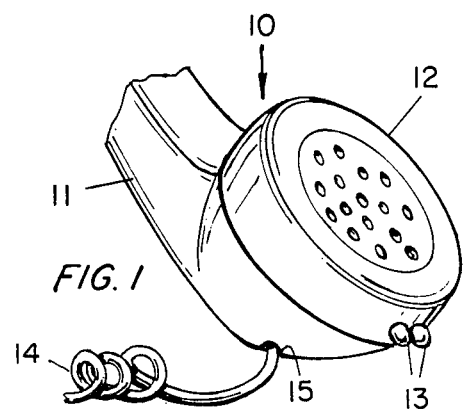
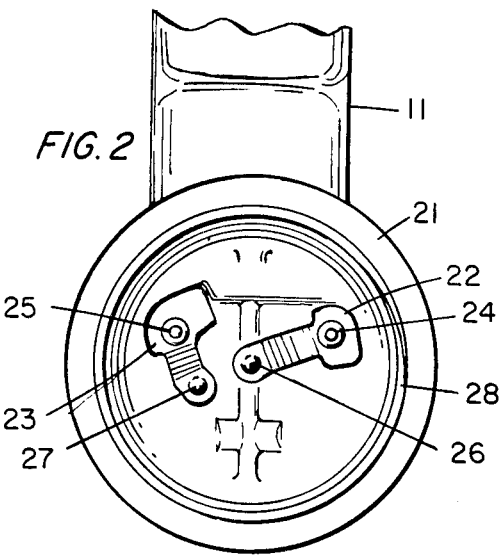
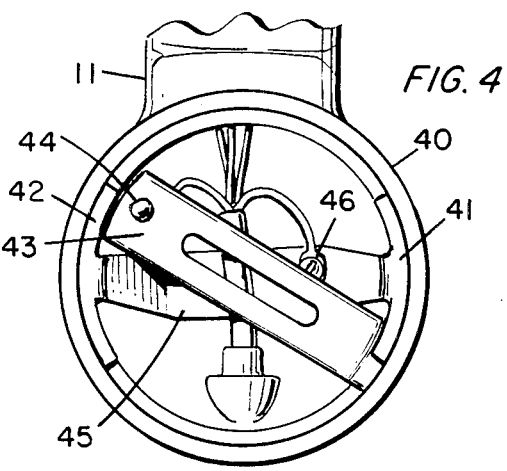
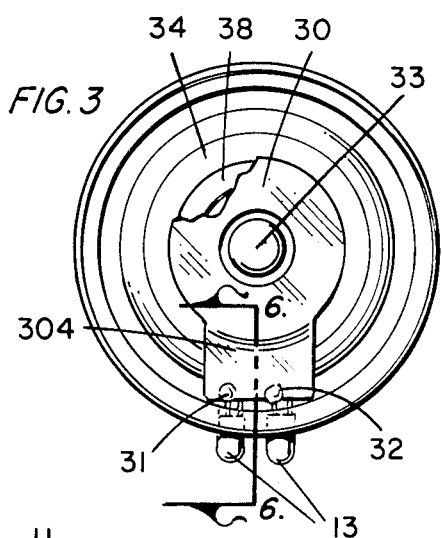
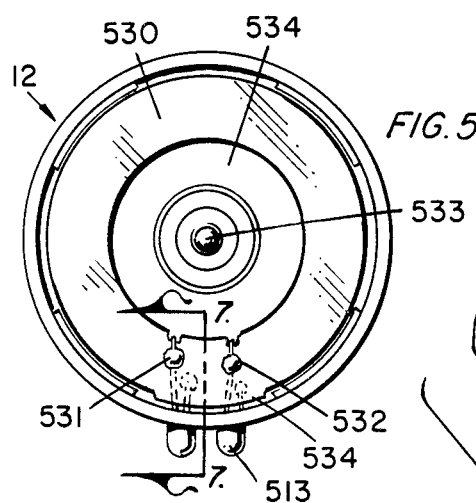
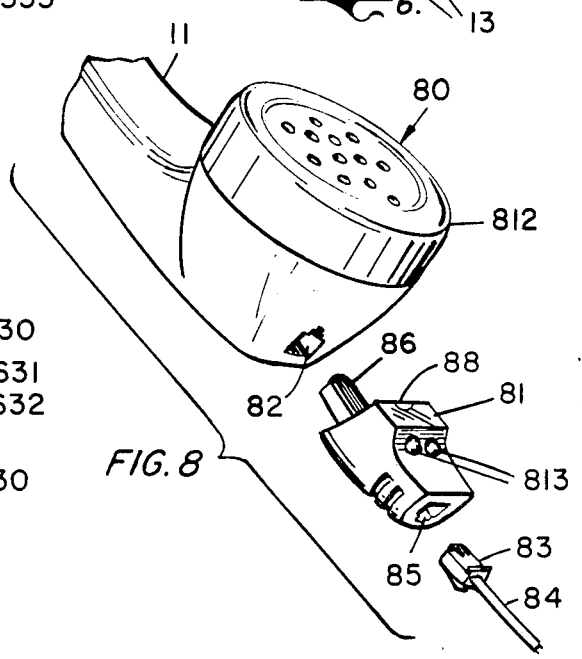
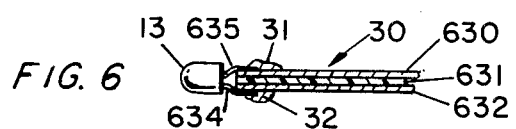
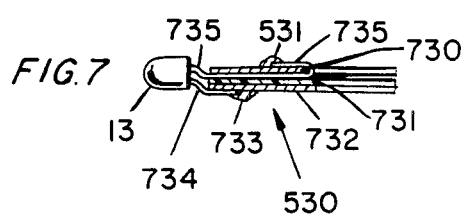

INTEGRAL PHONE LIGHT ACCESSORY

BACKGROUND

1. Field of the Invention

This invention is directed to telephone instruments, in general, and to a light which can be integrated into the existing telephone instrument, in particular, without adversely affecting the telephone operation.

2. Prior Art

There are many known telephone instruments available in the public domain. Many of these telephone instruments require and/or include a handset which is held by the telephone user and which includes an earpiece portion and a mouthpiece portion joined together by a gripping portion. In the current state of technology, most of the telephone instruments are arranged so that the handsets are modular in configuration, i.e. they can be readily connected or disconnected from a telephone cord associated with the telephone instrument. Other modular construction techniques have been implemented, as well, thereby to permit easy interconnection of various components of telephone instruments to suitable instruments, systems or the like.

In addition, many of these existing telephone instruments or devices include various accessories, attachments or related adjuncts designed to improve the usefulness of the telephone system. A listing of all of these accessories or attachments is not pertinent at this point. However, it should be noted that there are a number of accessories which relate to lights or light producing units. For example, the so-called "Princess" telephone (where Princess is a trademark of AT&T) includes a built-in light which is activated when the handset is removed from the cradle of the telephone instrument.

In like fasion, telephones with multiple line capability include push buttons which have lights included as a part thereof. The lights in the push button are also activated when the handset is removed from the cradle of the telephone. Other similar types of lighting systems may be available in the prior art but a detailed and exhaustive analysis thereof is not essential at this point. However, it should be noted that all of the telephone related lighting systems currently known in the prior art require additional circuitry and/or instrumentation to be appended to the existing telephone equipment. This appended equipment usually includes a transformer device, a line converting device, a connector box and many other related types of mechanisms or gear. All of this equipment can be purchased or leased from one or more telephone manufacturers and/or leasing systems. In either event, the equipment is relatively expensive to purchase, lease, or maintain. Moreover, most of this equipment requires additional housings and/or storage space. Likewise, the equipment is mounted in such a way as to be obtrusive and unattractive and to negatively impact interior decor or decorating schemes of the name or office.

In addition, many of these power converters, transformers or the like are inserted into the line in such a fashion as to require the consumption of electrical power which becomes a hidden cost in the use of these telephone instruments. In addition, in the event of a power outage, these lighting systems can become inoperative even though the telephone system remains functional.

In summary, the existing lighting apparatuses in telephone systems are unattractive and unwieldy, expensive to operate, expensive to maintain, and otherwise disadvantageous.

SUMMARY OF THE INSTANT INVENTION

This invention is directed to a light system which can be integrated into an existing telephone instrument and operate therewith without the requirement of any external or extraneous equipment or apparatus which requires special maintenance, special housings or the like. The lighting system is incorporated into the existing telephone equipment either through a special attachment to the mouthpiece of the handset or a modular, intra-line adaptor which incorporates light emitting units therein. These light emitting units are activated by the telephone instrument itself such that any operating telephone instrument will also provide the power for its own integrated light assembly.

BRIEF DESCRIPTION OF THE DRAWINGS

FIG. 1 is a perspective view of a portion of a typical telephone instrument handset with the instant invention included therein.

FIG. 2 is a drawing of the internal workings of one type of telephone handset.

FIG. 3 is a plan view of the mouthpiece covering for the telephone handset shown in FIG. 2, and including the instant invention.

FIG. 4 is a drawing of the internal workings of another type of telephone handset.

FIG. 5 is a plan view of a mouthpiece portion of a telephone instrument which interacts with the mouthpiece portion shown in FIG. 4, and including the instant invention therein.

FIGS. 6 and 7 are cross-sectional views of the connector portions of the inventions as shown in FIGS. 3 and 5, respectively.

FIG. 8 is an exploded view of another embodiment of the instant invention used in a modular intra-line configuration.

DESCRIPTION OF A PREFERRED EMBODIMENT

Referring now to FIG. 1, there is shown a portion of a telephone handset 10 taken in a perspective view. The portion of the handset shown in FIG. 1 is, in particular, the mouthpiece portion. The handset 10 includes the handle or gripping portion 11 which is broken for convenience of description. The mouthpiece 12 is a standard mouthpiece portion which includes a plurality of apertures therein through which sound waves can pass to the internal transducers. In typical fashion, the mouthpiece 12 is fabricated of a suitable plastic-type material such as delrin, nylon, ABS, or the like. In the standard phone, a cord 14 is connected to the handset with a modular connector or jack 15. The handset described thus far is typical of a standard telephone instrument.

Also included in the mouthpiece 12, as shown in FIG. 1, are a plurality of light elements 13. These elements can be in the form of small light bulbs, light emitting diodes, or any other element which is capable of selectively producing light when activated by the application of a suitable power source. In the preferred embodiment, the lights 13 comprise light emitting diodes which are polarity insensitive and which are activated by approximately 2.2 volts at about 15 to 40 milliamperes. In a preferred embodiment, the lights 13 are light emitting diodes which emit a greenish colored light. Although light emitting diodes (and other elements) are available to produce yellow light, red light, amber light or the like, the green light emitting units have been found to produce the most effective light in terms of usefulness in conjunction with this invention. As other devices or light sources become available, the implementation thereof into this invention is expected.

Referring now to FIG. 2, there is shown the internal workings of a typical telephone handset such as is fabricated by the Western Electric division of American Telephone and Telegraph Company (AT&T). This instrument includes the handle or gripping element 11 as before. The mouthpiece end, as shown in FIG. 2, includes a housing 21 which has a substantially circular outer configuration. The outer surface of housing 21 includes wall 28 which is usually threaded to receive the outer mouthpiece (described infra). The housing 21 is adapted to receive an inner housing element 27 also fabricated of a suitable plastic material such as ABS or the like. This housing 27 may have any suitable configuration although in one standard instrument, it has a cuplike configuration for receiving various components of the telephone instrument. It is inserted into housing 21 to cover other components which are mounted within housing 21 such as the telephone line in the telephone cord 14 and the modular connector 15 (which are not shown in FIG. 2).

Mounted in cup housing 27 are a pair of contacts 22 and 23. These contacts are mounted to the housing 27 by means of suitable connectors 24 and 25 which can be screws, rivets or the like. The free end of the connectors 22 and 23, typically, include dimples or bumps 26 which are used to make contact with the microphone transducer. The connectors 22 and 23 are, typically, fabricated of a spring metal which provides an electrical connection between the transducer and the wires which are mounted under the housing 27. The spring loaded contacts permit connection between the transducer and the remainder of the circuitry with a high degree of tolerance for the assembly of the instrument. These components and the arrangement thereof are standard in certain telephone instruments and are not a part of this invention, per se.

Referring to FIG. 3, there is shown a plan view of the mouthpiece 12 which is used in conjunction with the handset configuration shown in FIG. 2. This mouthpiece includes a substantially cup-shaped configuration with the exterior or peripheral wall 35 which is threaded at the inner surface thereof in order to engage the threads at the outer surface of wall portion 28 shown in FIG. 2. Within the mouthpiece 12 is located the voice pick-up transducer which is of standard design. This transducer includes, inter alia, two contact points which are shown as the annular contact 38 and the central, button-like contact 33. These contacts are arranged to make electrical contact with the connectors 22 and 23 shown in FIG. 2. This is the standard arrangement in this type of telephone instrument.

In the invention embodiment shown in FIG. 3, the light emitting elements 13 are shown mounted through the sidewall 35 of mouthpiece element 12. This mounting arrangement is provided by the expedient of producing holes or apertures in the sidewall 35 of housing 12. Preferably these holes can be molded, drilled or otherwise formed in the sidewall. In a preferred arrangement, the holes are arranged to be of the appropriate size so that the light emitting elements or fixtures 13 are snugly engaged thereby. By this expedient, the light elements 13 are retained in position by friction and without the necessity for providing a retaining apparatus or mechanism. This arrangement greatly simplifies the assembly and manufacturing techniques. In the event that such is necessary, a suitable retaining mechanism, not shown, can be provided. This mechanism can be in the nature of appropriate nuts, retainer rings, epoxy or the like.

In addition, the light emitting elements 13 are connected to a suitable connector device 30. This connector device takes the general form of an annulus or disk with an aperture in the center thereof and a tab 30A which extends therefrom. The aperture in disk 30 is arranged to be sufficiently large to surround, but not engage with, the button contact 33. Conversely, the disk 30 is arranged to have a sufficiently large diameter so that it will assuredly contact the outer contact rings 38 of transducer 34. In addition, the disk portion of connector 30 is arranged to make contact with the dimple (or other end portion) of connector 23 which normally contacts the ring connector contact 38 of the transducer. The aperture in disk 30 also permits contact 22 to make contact with contact 33 on transducer 34.

The tab 30A extends outwardly from the disk or washer-shaped contact 30 in a sufficiently lengthy dimension so as to substantially reach the inner surface of outer wall 35. This arrangement assists in the positioning of connector 30 and, also, permits connection with the conductor leads of light devices 13. As is shown in FIG. 3, a conductor lead from one of the light devices 13 is joined to tab 30A by means of a suitable connector such as a solder joint 31. Likewise, a conductor from the other light device 13 is joined to tab 30A by means of another solder joint 32. Of course, these connections can be made by any other suitable connection mechanism.

At this time, reference is also made to FIG. 6 to show the contact 30 in greater detail. FIG. 6 is a partial cross-sectional view of connector 30 taken along the line 6—6 in FIG. 3. Thus, it is seen that light device 13, typically a LED, has a pair of conductor leads 634 and 635 which extend therefrom. In addition, contact 30 comprises a sandwich-like configuration comprising a pair of sheets of conductive material such as copper or the like. The sheets 630 and 632 are separated by a suitable insulator layer 631 which can be fabricated of paper, mylar, or any other suitable insulating material. The sandwich element comprising layers 630, 631 and 632 has the plan configuration shown in FIG. 3. As shown in FIG. 6, the conductor leads 634 and 635 are connected to the conductor layers 632 and 630, respectively, by the solder joints 31 and 32, respectively.

When the sandwich-configured contact 30 is assembled as shown in FIG. 6 and mounted in housing 35 as shown in FIG. 3, the light elements 13 extend through the sidewall 35 of housing 12. The conductor surfaces 630 and 632 are disposed between the dimple 26 in connector 23 and the contact surface 38 of transducer 34. Moreover, these conductive surfaces 630 and 632 are connected together through the light devices 13 wherein the electrical connection between contact 23 and contact 38 is retained in a standard telephone. The contact 22 is free to contact button-like contact 33 in the usual fashion. Consequently, operation of the telephone instrument is not in any way adversely affected or diminished.

Also, by properly selecting the material of conductor layers 630 and 632 and selecting the configuration thereof, virtually no additional line impedance is placed within the telephone connection to the transducer. However, when the telephone is activated by lifting the handset from the cradle, the basic, low-power voltages and currents which are normally used in a telephone instrument are applied to and through the system in the normal fashion. With the light system of the instant invention in place, the power is transmitted through the light devices causing at least one of these devices to be activated. That is, if the devices are polarity sensitive, one of the devices will be activated and the other will not. In this case, it is highly desirable to have a pair of devices 13 connected in opposite sense. Moreover, in some telephone systems, the polarity of the signal supplied to the telephone instrument at the transducer is arranged to switch or change from one polarity to another upon the completion of certain functions such as, but not limited to, dialing or completion of a call. In this case, it is desirable to have a pair of light devices to be assured that at least one thereof is operable at any time. Of course, the lights are only activated when the telephone instrument is activated, i.e. the handset is removed from the cradle of the telephone instrument. Consequently, the lights 13 are activated only at this time. It will be noted that in daylight or highly illuminated areas, the light is relatively inconspicuous and would not function as a night light or the like. However, the light is sufficiently conspicuous so as to be able to discern that the handset is off the cradle and the power is supplied to the telephone instrument. This has a safety feature or facet indicating an "off-hook" condition. With this arrangement, the inconvenience of a non-receiving phone is avoided along with all of the attendent difficulties, safety considerations and the like.

Referring now to FIGS. 4, 5, and 6, there is shown another embodiment of the instant invention which is directed to a telephone instrument such as is fabricated by GTE (General Telephone & Electronic) or the like. In this type of instrument, the handset (including grip 11) includes an outer shell 40 which can be fabricated of any suitable plastic-like material as noted above. In this unit, an outer contact includes arcuate sections 41 and 42 which are supported on a lip in the outer body 40. These contacts 41 and 42 are connected together by a bridge device 45. Contacts 41, 42 and bridge 45 may be a unitary element which is placed in the phone and secured by means of a screw 46. The screw 46 can be used to connect the contacts to conductor wires within the phone instrument.

Another contact 43 is spaced away from and mounted above bridge 45. This contact element can also be placed in another shoulder or molded mounting place in shell 40. In a typical arrangement, a screw 44 is used to connect another conductor line from the telephone wires to the bridge contact 43.

Referring now to FIG. 5, there is shown the mouthpiece 12 which is used to hold the transducer 534 in the telephone instrument. Again, mouthpiece 12 is formed of a suitable plastic material and is arranged to have a sidewall 535 wich is threaded to engage the threaded portions of housing 40. Again, a pair of holes or apertures are provided in the sidewall 535 in order to receive the light devices 513 in much the same way as described relative to FIG. 3.

Again, a substantially disk or washer-shaped connector 530 is provided. In this embodiment, the connector 530 is of much larger diameter and is, essentially, contiguous or co-extensive with the inside diameter dimension of the housing 535. A tab 530A extends from disk 530 to the extent necessary to achieve the dimensional arrangement discussed relative to the embodiment shown in FIG. 3. That is, the tab 530A provides the positioning and mounting advantage, as well as providing a means for connecting the connector to the conductor leads of light devices 513. In addition, the central aperture of disk 530 is, in this case, larger than the aperture in disk connector 30 because of the configuration of the transducer 534.

When the mouthpiece components shown in FIG. 5 are assembled with the handset element shown in FIG. 4, the button-like contact 533 is placed in electrical contact with the bridge contact 43. In addition, the outer contact ring of transducer 534 (not shown but substantially similar to the contact 38 shown in FIG. 3 and of greater diameter) comes into engagement with contacts 42 and 41.

With the connector 530 in place, the connection between contact portions 41 and 42 and the outer rim of the transducer 534 is maintained. The connection between button-like contact 533 and bridge 43 is not in anyway impaired.

Referring to FIG. 7, there is shown a partial cross-sectional view of contact 530. Again, this contact comprises a sandwich-like configuration comprising electrically conductive layers 730 and 732 separated by an insulating layer 731. However, in this case, one of the conductor leads, e.g. lead 734, is located on the outer surface of the bottom contact surface 733 and joined thereto by a suitable connection such as a solder joint 733.

Conversely, the other contact lead 735 is placed between the upper connector layer 730 and the insulating layer 731, passed under the conductor layer 730 and wrapped around the inner edge of the central aperture of contact 530. The contact lead 735 is then brought into contact with the upper surface of conductor layer 730 and electrically joined thereto by means of a solder joint, weld or the like. Insulator layer 731 prevents electrical connection between layer 732 and conductor lead 735. The necessity for this connection of the conductor leads is to permit lead 735 to avoid contact portions 41 and 42 which extend from bridge conductor 45. That is, because of the tolerances in the equipment, conductor lead 735 would interfere with the closure of the housing 12 with the handset or, alternatively, the contact portions 41 and/or 42 would engage conductor lead 735 and/or break same, causing potential electrical failure of the light, the telephone system, or the entire system.

Once the mouthpiece 12 and connector 530 of FIG. 5 is assembled to the remainder of the handset shown in FIG. 4, the circuit operates in the same fashion as the embodiment shown and described relative to FIGS. 2, 3 and 6.

Referring now to FIG. 8, there is shown an exploded view of another embodiment of the instant invention. In this case, it is found that some telephone handsets are arranged to effectively preclude the insertion of the connector such as connector 30 or 530 within the system due to different handset geometric design. In this case, the handset 80 includes a standard aperture 82 for modular telephone equipment. The standard phone jack 83 and phone cord 84 are, typically, placed therein. In the embodiment shown in FIG. 8, a connector unit 81 is provided. This unit includes aperture 85 which is configured substantially the same as the aperture 82 in the handset 80. In addition, connector 81 includes a tongue 86 which extends from the other end thereof and is also configured the same as phone jack 83. This tongue 86 is adapted to engage aperture 82 in handset 80. In addition, aperture 85 is configured to receive phone jack 83. Thus, with the connector 81 in place, a full and proper connection is formed within the telephone line.

As shown, connector 81 includes a pair of light devices 813 mounted therein. These devices are connected to the internal wiring within connector device 81 which wiring is arranged to form the inner connection between jack 83 and aperture 82 in hand set at 80. Thus, lights 813 are activated in the same fashion as the lights 13 and 513 in the other embodiments.

It is noted in a preferred embodiment, a slot or groove 88 is provided in the surface of connector device 81 which abuts against the external surface of handset 80. This permits access to the snap latch at tongue 86 which latches with the handset 80. Thus, the parts can be selectively disengaged by the insertion of an appropriate implement in slot 88.

Thus, there are shown and described preferred embodiments of a phone light device. The device provides safety features by indicating when the telephone is off the hook, it provides light for dialing the telephone at night, it provides light for reading a telephone number in a directory at night, and other advantages. The light system of this invention has further advantages in that it is contained integrally, within the telephone instrument and does not require bulky, external power consuming parts. It is a relatively inexpensive part which can be purchased and installed by any telephone instrument user. The cost of leasing this type of device would be minimal, if any. The light and connector unit can be provided separately and added to an existing phone through the expedient of providing two apertures in the existing mouthpiece housing. Conversely, the unit can be included in a mouthpiece unit which would be fabricated in accordance with the style, configuration and coloration of existing phones and presented as a complete unit to replace the existing mouthpiece portion of telephone instruments. It is obvious that others skilled in the art may conceive of modifications to this invention. However, any such modifications which fall within the purview of this description are intended to be included therein as well. The description is intended to be illustrative only and is not intended to be limitative. The scope of the invention is limited only by the claims appended hereto.

We claim:

1. A light device for use with existing telephone instruments comprising,
   a mouthpiece transducer housing (12) adapted to detachably engage the existing handset portion (10) of a telephone instrument,
   at least one aperture formed in the sidewall of said mouthpiece transducer housing,
   light emitting device means (13) arranged to be mounted in the aperture in said housing, and
   a wafer-like electrical conductor (30, 530) having an annulus configuration joined to said light emitting device and mounted within said mouthpiece transducer housing adjacent to the transducer and adapted to be connected with the electrical power line in the handset of the telephone instrument whereby said light emitting device selectively is activated solely by the electrical power produced in said telephone instrument.

2. The lighting device recited in claim 1 including,
   an extender portion which protrudes from the edge of said conductor and which is connected to said light emitting device.

3. The lighting device recited in claim 1 wherein,
   said conductor comprises two layers of conductive material separated by a layer of insulating material.

4. The lighting device recited in claim 3 wherein,
   said light emitting device means includes a pair of electrical conductors each separately connected to a different one of said layers of conductive material.

5. The lighting device recited in claim 1 wherein,
   said light emitting device means comprises a light emitting diode (LED).

6. The device recited in claim 4 wherein,
   each of said pair of electrical conductors is mounted at the exterior surface of the respective layers of conductive material.

7. The device recited in claim 5 wherein,
   said LED produces light from the group of red, amber, white and green.

8. The device recited in claim 1 wherein,
   said wafer-like electrical conductor is substantially circular in configuration with a central aperture therethrough to accomomodate the existing mouthpiece transducer in the existing telephone instrument.

9. A light producing device for use with telephone handset equipment by interconnection in-line into the existing telephone system,
   at least one light emitting device,
   support means for supporting at least one light emitting device to selectively project light toward the front of said handset equipment, and
   connector means for connecting said light emitting device in-line with the existing lines in said telephone system whereby said telephone system remains unaffected and said light emitting device receives power when said telephone system is activated,
   said connector means including modular construction whereby it is interchangeable with existing telephone equipment.

10. The device recited in claim 9 wherein,
    said connector means is mounted external to said telephone handset.

11. A light producing device for use with a telphone handset comprising,
    a housing having at least one light emitting device means mounted therein,
    a projection from one end of said housing which is configured to engage with a modular connection slot in said handset,
    an aperture in another end of said housing which is configured to receive and engage a modular conenection jack in the existing telephone wires,
    said projection including a resilient latch means for locking said housing to said handset.

12. The device recited in claim 11 including, slot means formed in said housing adjacent said projection in order to permit access to said latch means to selectively unlock said housing from said handset.

13. The device recited in claim 12 wherein,
    said light emitting device meanse is disposed adjacent said aperture in said housing.

14. The device recited in claim 11 wherein,
   said housing is constructed with a slanted axis such that said projection and said aperture are not axially aligned.
15. The device recited in claim 11 including,
   electrically conductive means mounted therein and arranged to connect said light emitting device means to contact means at said projection and at said aperture.

* * * * *